United States Patent [19]

Larkin

[11] Patent Number: 4,695,731

[45] Date of Patent: Sep. 22, 1987

[54] IONIZATION CHAMBER

[75] Inventor: Keith J. Larkin, Uckfield, England

[73] Assignee: U.S. Philips Corporation, New York, N.Y.

[21] Appl. No.: 762,008

[22] Filed: Aug. 2, 1985

[30] Foreign Application Priority Data

Sep. 10, 1984 [GB] United Kingdom ................. 8422786

[51] Int. Cl.[4] ............................................ G01T 1/185

[52] U.S. Cl. .................................... 250/374; 250/375

[58] Field of Search ...................... 250/374, 375, 358.1

[56] References Cited

U.S. PATENT DOCUMENTS 2,884,537 4/1959 Swift, Jr. ......................... 250/358.1

3,110,835 11/1963 Richter et al. ...................... 250/374

FOREIGN PATENT DOCUMENTS 149892 11/1980 Japan .................................. 250/374

109872 6/1983 Japan .................................. 250/374

*Primary Examiner*—Carolyn E. Fields

*Attorney, Agent, or Firm*—Paul R. Miller

[57] ABSTRACT

To enable an ionization chamber used for measuring the intensity of a beam of ionizing radiation, for example an electron beam produced by a linear accelerator and used for radiotherapy, both to give an output signal which is independent of ambient pressure and temperature and to present a low weight of scattering material per unit area to the beam, the chamber is of flexible construction so that the volume of gas in it adapts to ambient pressure and temperature, and such that the weight of gas in the active region between the electrodes per unit area remains substantially constant. Suitably, the electrodes are conductive layers on flexible plastics sheets, an outer annular portion of one sheet providing a flexible connection between two opposed chamber wall portions which remain substantially planar and parallel; the proportional change ($\Delta V_1/V_1$) in a volume bounded by the opposed wall portions and including the active region equals the proportional change ($\Delta V_2/V_2$) in the remainder ($V_2$) of the internal volume.

14 Claims, 2 Drawing Figures

IONIZATION CHAMBER

Figure 1:
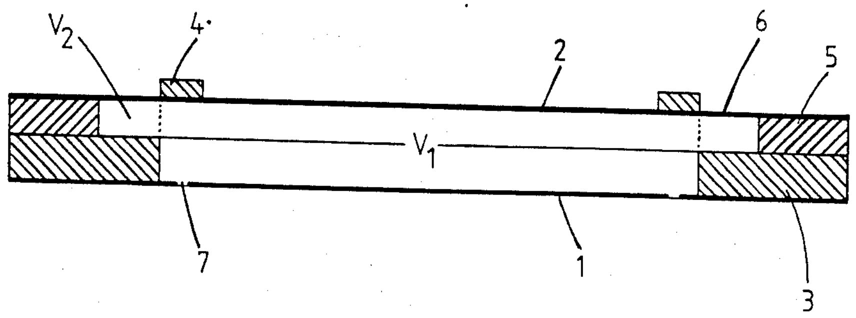

The invention relates to an ionisation chamber for measuring the intensity of a beam of ionising radiation, and in particular but not exclusively, to a transmission ionisation chamber suitable for measuring the intensity of a beam of electrons produced by a linear accelerator (linac) used in radiotherapy.

Ionisation chambers are used with linacs to measure the intensity of the beam of electrons produced by the linac, and may also be used to measure the intensity of a beam of X-rays produced by causing the beam of electrons to impinge on a target. By integrating the output of the chamber, the total radiation dose produced in a period of time may be determined, and the ionisation chamber may be coupled to control equipment arranged to switch off the linac when a desired radiation dose has been delivered. Suitably, the entire beam passes through the chamber after passing through any absorbing or scattering material used to alter characteristics of the beam. In use, beams of various diameters may be employed as required.

An ionisation chamber contains an ionisable gas, and comprises two spaced electrodes between which a potential difference is applied to produce an electric field of, for example, 140 V/mm. When ionising radiation enters the chamber, some of the atoms or molecules of the gas become ionised, and a current flows between the electrodes. The magnitude of the current is directly proportional to the intensity of the radiation and to the number of atoms or molecules of the gas (i.e. the weight of gas) between the electrodes.

Ionisation chambers may be open or closed. In an open chamber, the gas between the electrodes is at ambient pressure and temperature with the result that when the ambient pressure or temperature changes, the weight of gas between the electrodes changes as the gas expands or contracts. It is then necessary to recalibrate the ionisation chamber. Alternatively, pressure and temperature sensing devices may be associated with the chamber to provide electrical compensation of the output of the chamber, but it is difficult to achieve a desired accuracy with such devices (for example, better than 1%), and the sensing devices and their associated circuitry constitute additional sources of potential error and unreliability which is especially undesirable in medical applications.

In a closed ionisation chamber, the gas and the electrodes are contained within a sealed chamber having walls are sufficiently thick to resist the effect on the gas of changes in ambient pressure and temperature with the volume of gas in the chamber and consequently the weight of gas between the electrodes remaining sustantially constant over desired operating ranges of pressure and temperature. However, at least with respect to the measurement of electron beam intensity, it is generally desirable for the chamber to present a minimum of scattering material to the beam. The thickness of material sufficient to provide a substantially rigid chamber can be restrictive in terms of the beam-flattening possibilities (i.e. obtaining uniform characteristics across the beam) prior to the chamber.

According to the invention, a device for measuring the intensity of a beam of ionising radiation is provided which comprises a closed chamber containing an ionisable gas approximately at ambient pressure, the chamber containing two opposed electrodes adapted to have a potential difference applied between them for producing an ionisation current as a result of ionising radiation entering the chamber, wherein the chamber is of flexible construction such that the volume of the gas in the chamber varies with changes in ambient pressure and temperature and such that within respective operating ranges of ambient pressure and temperature, the weight of the gas in the active region between the electrodes, within which region the ionisation current flows in use, per unit area measured in a plane normal to a line intersecting the electrodes remains substantially constant.

If the volume $V_A$ of gas in the active region is less than the total volume $V_T$ of gas in the chamber, a substantially constant weight of gas in the active region per unit transverse area may be obtained if change $\Delta V_A$ and $\Delta V_T$ produced in $V_A$ and $V_T$ respectively by a change in ambient pressure and/or temperature within the operating ranges are such that $\Delta V_A/V_A$ is substantially equal to $\Delta V_T/V_T$.

To suitably assist in obtaining a substantially uniform electric field between the electrodes and to simplify the design and construction of the chamber, the electrodes have substantially planar and substantially parallel facing surfaces, and as the volume of gas in the chamber adapts to changes in ambient pressure and temperature within the respective operating ranges, the surfaces remain substantially planar and substantially parallel.

Suitably, the electrodes are dispoed between a pair of opposed chamber wall portions, and the ability of the volume of gas in the chamber to adapt to changes in ambient pressure and temperature may result (at least in part) from the opposed wall portions being flexibly connected around their peripheries by one or more further wall portions with the total volume of gas in the chamber being substantially the sum of a first volume $V_1$ which is bounded by the opposed wall portions and which comprises the entire active region and a second volume $V_2$ bounded by one or more of the further wall portions.

To simplify the design and construction of the chamber, the ratio $V_A/V_1$ may remain substantially constant, as the volume of gas in the chamber adapts to changes in ambient pressure and temperature within said respective operating ranges.

To further simplify the design and construction, the shape and size of each pair of opposed wall portions may remain substantially unchanged, as the volume of gas in the chamber adapts to changes in ambient pressure and temperature within said respective operating ranges.

To enable a particularly simple and compact structure, one or more wall portions comprising a further wall portion may be of flexible film material. Suitably, the further wall portion of flexible film material forms a loop around one pair of opposed wall portions with, the inner periphery of the loop being connected to one opposed wall portion and the outer periphery of the loop being connected to a substantially rigid support member. The further wall portion of flexible film material may be opposed to another further wall portion and, to enable a constant weight of gas to be maintained in the active region, be separated therefrom by a gap having an average width substantially less than the average width of the gap between the electrodes.

Further to simplify the structure, at least one of the two electrodes may be at the inner surface of a respective one of the pair of opposed wall portions. To enable a particularly low weight of scattering material to be presented to the beam of ionising radiation, at least one of the pair of opposed wall portions may be of electrically insulating material and the at least one electrode may be an electrically conductive layer thereon. Suitably, the device comprises a first sheet of flexible film material in which an inner area forming the one opposed wall portion is held at a relatively high tensile force with the sheet being attached around the periphery of the inner area to a frame member, and in which an outer area forming the loop is held at a relatively low tensile force between the frame member and the support member. The device may comprise a second sheet of flexible film material being held at a relatively high tensile force to form the other of the pair of opposed wall portions, and being attached around its periphery to a frame and support member to which the support member is attached.

Figure 2:
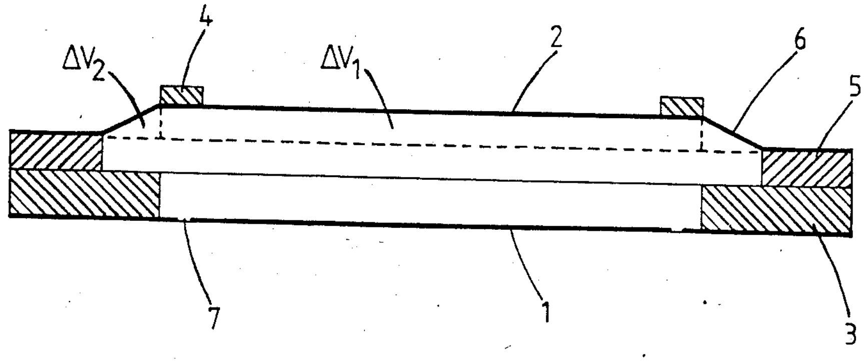

An embodiment of the invention will now be described, by way of example, with reference to the accompanying diagrammatic drawings, in which:

FIG. 1 is a schematic cross-sectional view of an ionisation chamber embodying the invention, and FIG. 2 is a corresponding view of the ionisation chamber of FIG. 1 with an increased volume (due, for example, to lower ambient pressure).

The ionisation chamber shown in the drawings is a full-field transmission ionisation chamber for use with a linac to measure the intensity of both the beam of electrons produced by the linac and a beam of X-rays which may alternatively be produced by causing the electron beam to impinge on a transmission X-ray target. The chamber is of circular shape in a horizontal plane normal to the plane of the drawings. Its height (vertical dimension) has been exaggerated relative to its diameter for the sake of clarity. The chamber comprises two opposed sheets 1 and 2 respectively of thin, flexible plastics material each bearing a thin metal coating on their inner surfaces, i.e. the surfaces which face each other. The sheets may for example, by commercially available aluminised polyester film with the polyester having a thickness of 12 μm and the aluminium an optical density of 2.5. Sheet 1 is bonded, for example by adhesive, to a frame and support ring 3, suitably of conductive material, for example aluminium, in such a manner that at least the portion of the sheet within the inner periphery of the ring is held at a relatively high tensile force. Sheet 2 is bonded, for example by adhesive, to a frame ring 4 having an outer diameter substantially equal to the inner diameter of ring 3, in such a manner that the portion of sheet 2 within the inner periphery of ring 4 is likewise held at a relatively high tensile force. Sheet 2 also extends radially outward from ring 4 to a support ring 5 having an inner diameter greater than the outer diameter of ring 4. Sheet 2 is bonded to ring 5 in such a manner that the annular loop portion 6 of the sheet between rings 4 and 5 is held at a relatively low tensile force. (The rings 3–5 are substantially rigid.) Ring 5, which is of electrically insulating material, is bonded to ring 3 so that the interior of the chamber, the region bounded by the sheets 1 and 2 and by the rings 3 and 5, is gas-tight. The chamber contains gas, for example air, approximately at ambient pressure. (With the chamber disposed as shown in the drawings, the pressure inside the chamber is slightly greater than outside to support the weight of the ring 4.)

The metallisation on sheet 1 is interrupted by an annular gap, depicted schematically at 7, close to and concentric with the ring 3. The circular area of metallisation bounded by gap 7 forms one electrode. An insulated conductive lead (not shown) is electrically connected thereto and is taken out of the chamber through an aperture (not shown) in the ring 5 (the aperture being sealed after insertion of the lead in it). The metallisation on sheet 2 is uninterrupted with, the circular area thereof within the inner periphery of ring 5 forming the second electrode. A portion (not shown) of sheet 2 may extend beyond the outer periphery of ring 5 and another conductive lead (not shown) be connected outside the chamber to the metallisation on sheet 2.

The chamber is suited to measuring the intensity of a beam of electrons or a beam of X-rays of any diameter not greater than the inner diameter of ring 4. In use, the beam of ionising radiation passes through the chamber approximately normal to the sheets 1 and 2. A potential difference is applied between the electrodes with that on sheet 1 being maintained substantially at ground potential and a negative voltage being applied to that on sheet 2; ring 3 and the metallisation on sheet 1 that is contiguous with ring 3 and that lies outside gap 7 is grounded. Energetic electrons of X-rays entering the chamber cause ionisation of the gas therein, resulting in an electric current flowing between the electrodes on sheets 1 and 2 under the applied potential difference. This ionisation current is detected by the lead attached to the electrode on sheet 1. The active region in which the ionisation current flows is substantially a right circular cylinder extending between the sheets 1 and 2 with one end of the cylinder being the electrode on sheet 1. The planar parallel electrodes, the extension of the electrode on sheet 2 radially beyond the active region, and the grounded conductive surfaces which bond the lower part of the interior of the chamber (thereby providing a "guard ring") ensure that the electric field within the active region of the chamber is substantially uniform and normal to the electrodes, and that any leakage current within the chamber should not substantially affect the current derived from the lead attached to the electrode on sheet 1.

The magnitude of the current is proportional to the intensity of the ionising radiation and to the number of gas molecules (or the weight of gas) in the active region of the chamber.

The construction of the chamber is such that the total volume $V_T$ of gas inside it can adapt to changes in ambient pressure and temperature. FIG. 2 shows the chamber with an increased volume compared with FIG. 1 (due, for example, to a decrease in ambient pressure or an increase in ambient temperature) with the change in volume being greatly exaggerated in the drawings for the sake of clarity. The difference between the tensile force under which the annular portion 6 of sheet 2 is held and the tensile forces under which the opposed circular portions of sheets 1 and 2 are held results in the cross-sectional shape (in the plane of the drawings) of these circular portions remaining substantially unchanged (substantially planar in this case) as the pressure and temperature vary within typical operating ranges with the change in volume resulting from flexing of the annular portion 6 so that the circular portion of sheet 2 extending to the outer periphery of ring 4 is displaced normal to itself, as indicated schematically in the drawings.

The arrangement is such that as the total volume of gas in the chamber changes, the number of gas molecules (or weight of gas) in the active region of the device remains substantially constant. Since in this case the volume $V_A$ of the active region is less than the total internal volume $V_T$ of the chamber, this is achieved by arranging that the ratio $V_A/V_T$ remains substantially constant as $V_T$ varies. The total volume $V_T$ may be considered (see FIG. 1) as the sum of a first volume $V_1$, in the shape of a right circular cylinder of diameter equal to the inner diameter of ring 3 and height equal to the spacing between sheets 1 and 2, and a second volume $V_2$ which is of annular cross-section, being bounded by the further wall portions constituted by the annular portion 6 of sheet 2 and the opposed surface portion of ring 3, and the inner circumferential surface of ring 5, and also bounded by the volume $V_1$. The dotted lines in FIG. 1 denotes the boundary (of circumferential shape) between $V_1$ and $V_2$. To simplify the design and construction, the volume $V_A$ of the active region is a constant proportion of $V_1$ (substantially the ratio of the area of the electrode on sheet 1 to the area of sheet 1 within ring 3). When the gas expands (FIG. 2), the first volume $V_1$ increases by $\Delta V_1$ and the second volume $V_2$ by $\Delta V_2$; the dashed lines in FIG. 2 denote the boundaries of $\Delta V_1$ and $\Delta V_2$. The arrangement is such that the proportional increase in $V_1$, $\Delta V_1/V_1$, is substantially equal to the proportional increase in $V_2$, $\Delta V_2/V_2$with this proportional increse also substantially equalling the proportional increase in $V_A$ and the proportional increase in $V_T$. In this case, this is obtained by making the height of the volume $V_2$ of annular cross-section substantially less than the height of the volume $V_1$ of circular cross-section, thus compensating for the fact that the change in height of $V_2$ varies across the annulus 6 from the change in height of $V_1$, at the inner periphery of the annulus, to zero at the outer periphery of the annulus.

Embodiments generally of the kind described above with reference to the drawings have been constructed and found to operate reliably and accurately. Accuracy was better than 1% over operating ranges of ±10% variation in ambient pressure about a mean value and ±30° C. variation in temperature about a mean value (i.e. approximately ±10% of typical room temperature in °K.).

Radiation therapy apparatus comprising a linac as a source of an electron beam may incorporate a pair of successive ionisation chambers with each of the pair embodying the invention. The pair of chambers may be located beyond the position in which a transmission X-ray target can be inserted into the beam (for X-ray therapy rather than electron beam therapy) and immediately after the position at which one or more foils can be used to improve the uniformity of intensity across the electron or X-ray beam. At such a location, the electron beam is still of fairly small diameter with the beam diverging from the exit of the vacuum system of the apparatus (i.e. of the linac itself in the case of a linac short enough to be substantially collinear with the treatment beam incident on the patient, or of a bending magnet arrangement used to deflect the electron beam in the case of a longer linac). While the central region of the beam may pass through each chamber normally, the outer region will, in view of the divergence of the beam, pass through in directions inclined to the normal. To obtain an ionisation current which is independent of ambient pressure and temperature, the weight of gas between the electrodes per unit area measured in a plane normal to each of those directions should not vary substantially with the pressure and temperature.

As an alternative to the above-described chamber, a chamber embodying the invention may for example, comprise two electrodes disposed between a pair of opposed, flexibly connected wall portions of relatively rigid material (bearing in mind how low a weight of scattering material per unit transverse area it is desired that the chamber should present to the beam). An electrode need not be at the inner surface of a wall but may be mechanically distinct from a wall by being, for example a conductive layer on a stretched flexible sheet supported by and coupled to a wall by a ring such as the ring 4 in the above-described embodiment (the ring being inside the chamber).

As indicated above, an ionisation chamber embodying the invention can be of relatively simple design and utilise a few components of low cost. Although the above-described chamber has particularly been devised to be suitable for use as a transmission chamber to measure the intensity of an electron beam produced by a linac, ionisation chambers embodying the invention are not limited to such applications, especially in view of the simplicity and compactness that can be achieved: they may, for example, find application in diagnostic X-ray apparatus.

I claim:

1. A device for measuring intensity of a beam of ionizing radiation comprising a closed chamber having at least one flexible wall through which ionizing radiation is passed, an ionizable gas completely contained in said closed chamber at an ambient pressure, said gas having a total volume of $V_T$, and two opposing electrodes contained in said closed chamber, one of said two electrodes being disposed on said flexible wall, said two electrodes having an applied potential difference for producing an ionization current from said ionizing radiation, said two electrodes defining an active region therebetween having a volume $V_A$, said volume $V_A$ being less than $V_T$, said ionization current flowing in said active region, wherein said volume $V_T$ and said volume $V_A$ both vary with changes in ambient pressure and in ambient temperature, said changes in ambient pressure and ambient temperature producing changes $\Delta V_T$ and $\Delta V_A$ in $V_T$ and $V_A$ respectively, wherein a proportional change $\Delta V_A/V_A$ in said volume of said active region is substantially equal to a proportional change $\Delta V_T/V_T$ in said total volume within operating ranges of said ambient pressure and said ambient temperature, and wherein said ionizable gas in said active region has a weight per unit area remaining substantially constant when measured in a plane normal to a line intersecting said electrodes.

2. A device according to claim 1, wherein said two electrodes have substantially planar, parallel facing surfaces, said facing surfaces remaining planar and parallel upon changes of said total volume $V_T$ and said volume $V_A$.

3. A device according to claim 1 or claim 2, wherein said two electrodes are disposed between a pair of opposing walls, said opposing walls being flexibly connected around peripheries of said opposing walls to a peripheral wall, and wherein said total volume $V_T$ is substantially a sum of a first volume $V_1$ and a second volume $V_2$, said first volume $V_1$ including said active region entirely and being bounded by said pair of opposing walls, and said second volume $V_2$ being bounded by at least said peripheral wall.

4. A device according to claim 3, wherein a ratio of $V_A/V_1$ remains substantially constant upon changes in said total volume $V_T$.

5. A device according to claim 3, wherein said pair of opposing walls have a shape and size remaining substantially unchanged upon said changes in ambient pressure and ambient temperature.

6. A device according to claim 3, wherein said peripheral wall is of flexible film material.

7. A device according to claim 6, wherein said peripheral wall forms a loop structure about one of said pair of opposing walls, said loop structure having an inner periphery connected to said one of said pair of opposing walls, and said loop structure having an outer periphery connected to a substantially rigid first frame member.

8. A device according to claim 7, wherein said peripheral wall is separated by a gap from a second frame member, said gap having an average width substantially less than separation between said two electrodes.

9. A device according to claim 8, wherein said one of said pair of opposing walls is held at a high tensile force, said one wall being attached to a support member adjacent to said inner periphery of said peripheral wall, and wherein said loop structure between said support member and said first frame member is held at a relatively low tensile force.

10. A device according to claim 9, wherein the other of said pair of opposing walls is a second sheet of flexible film material being held at a high tensile force, said other opposing wall being attached to said second frame member.

11. A device according to claim 8, wherein said two electrodes are disposed at an inner surface of said pair of opposing walls.

12. A device according to claim 11, wherein said pair of opposing walls are an electrically insulating flexible film material, and said two electrodes are an electrically conductive layer disposed on said electrically insulating material.

13. A device according to claim 3, wherein said two electrodes are disposed at an inner surface of said pair of opposing walls.

14. A device according to claim 13, wherein said pair of opposing walls are an electrically insulating flexible film material, and said two electrodes are an electrically conductive layer disposed on said electrically insulating material.

* * * * *